US00RE46193E

(19) United States
(12) Reissued Patent
Anderson et al.

(10) Patent Number: US RE46,193 E
(45) Date of Reissued Patent: Nov. 1, 2016

(54) DISTRIBUTED POWER CONTROL FOR CONTROLLING POWER CONSUMPTION BASED ON DETECTED ACTIVITY OF LOGIC BLOCKS

(71) Applicant: TEXAS INSTRUMENTS INCORPORATED, Dallas, TX (US)

(72) Inventors: Timothy David Anderson, University Park, TX (US); Lewis Nardini, Richardson, TX (US); Jose Luis Flores, Richardson, TX (US); Abhijeet Chachad, Plano, TX (US); Raguram Damodaran, Raleigh, NC (US); Joseph R. M. Zbiciak, Farmers Branch, TX (US); Gary Swoboda, Sugar Land, TX (US)

(73) Assignee: TEXAS INSTRUMENTS INCORPORATED, Dallas, TX (US)

(21) Appl. No.: 14/303,262

(22) Filed: Jun. 12, 2014

Related U.S. Patent Documents

Reissue of:
(64) Patent No.: 8,201,004
Issued: Jun. 12, 2012
Appl. No.: 11/855,602
Filed: Sep. 14, 2007

U.S. Applications:
(60) Provisional application No. 60/825,625, filed on Sep. 14, 2006, provisional application No. 60/681,438, filed on May 16, 2005.

(51) Int. Cl.
*G06F 1/32* (2006.01)

(52) U.S. Cl.
CPC ..... *G06F 1/3203* (2013.01); *G06F 1/3243* (2013.01); *Y02B 60/1239* (2013.01); *Y02B 60/32* (2013.01)

(58) Field of Classification Search
CPC ..... G06F 1/3203; G06F 1/3243; Y02B 60/1239; Y02B 60/32
USPC ..... 713/300, 310, 320–324; 710/300, 310, 710/320–324
See application file for complete search history.

(56) References Cited

U.S. PATENT DOCUMENTS 5,546,591 A * 8/1996 Wurzburg et al. ..... 713/322
5,887,179 A * 3/1999 Halahmi et al. ..... 713/324

(Continued)

FOREIGN PATENT DOCUMENTS

JP 2000305743 11/2000
JP 2001027920 1/2001

(Continued)

*Primary Examiner* — Behzad Peikari
(74) *Attorney, Agent, or Firm* — Charles A. Brill; Frank D. Cimino

(57) ABSTRACT

An embedded megamodule and an embedded CPU enable power-saving through a combination of hardware and software. The CPU configures the power-down controller (PDC) logic within megamodule and can software trigger a low-power state of logic modules during processor IDLE periods. To wake from this power-down state, a system event is asserted to the CPU through the module interrupt controller. Thus the entry into a low-power state is software-driven during periods of inactivity and power restoration is on system activity that demands the attention of the CPU.

14 Claims, 2 Drawing Sheets

(56) References Cited

U.S. PATENT DOCUMENTS

| | | | | |
|---|---|---|---|---|
| 5,910,930 | A * | 6/1999 | Dieffenderfer et al. | 368/156 |
| 6,212,645 | B1 * | 4/2001 | Tjandrasuwita | 713/330 |
| 6,446,214 | B2 * | 9/2002 | Chrysanthakopoulos | 713/310 |
| 6,525,593 | B1 * | 2/2003 | Mar | G06F 1/08 327/530 |
| 6,665,802 | B1 * | 12/2003 | Ober | 713/320 |
| 6,742,097 | B2 | 5/2004 | Woo et al. | |
| 6,986,074 | B2 * | 1/2006 | Alia et al. | 713/601 |
| 7,100,013 | B1 | 8/2006 | De Waal | |
| 7,127,560 | B2 | 10/2006 | Cohen et al. | |
| 7,178,044 | B2 * | 2/2007 | Pappalardo et al. | 713/300 |
| 7,437,576 | B2 | 10/2008 | Makiyama et al. | |
| 7,549,034 | B2 | 6/2009 | Foster et al. | |
| 2002/0016904 | A1 * | 2/2002 | Chrysanthakopoulos | 712/24 |
| 2002/0184547 | A1 * | 12/2002 | Francis et al. | 713/322 |
| 2003/0028711 | A1 | 2/2003 | Woo et al. | |
| 2003/0079150 | A1 * | 4/2003 | Smith et al. | 713/320 |
| 2004/0128445 | A1 | 7/2004 | Israeli et al. | |
| 2005/0055592 | A1 * | 3/2005 | Velasco et al. | 713/322 |
| 2005/0239518 | A1 * | 10/2005 | D'Agostino et al. | 455/574 |
| 2007/0124538 | A1 | 5/2007 | Abadeer et al. | |
| 2008/0313482 | A1 | 12/2008 | Karlapalem et al. | |

FOREIGN PATENT DOCUMENTS

| | | |
|---|---|---|
| JP | 2001249908 | 9/2001 |
| JP | 2003333045 | 11/2003 |
| WO | WO 2005069148 | 7/2005 |

* cited by examiner

DISTRIBUTED POWER CONTROL FOR CONTROLLING POWER CONSUMPTION BASED ON DETECTED ACTIVITY OF LOGIC BLOCKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM TO PRIORITY OF PROVISIONAL APPLICATION

This application claims priority under 35 U.S.C. §119(e)(1) of provisional application No. 60/681,438, filed May 16, 2005 and 60/825,625, filed Sep. 14, 2006.

TECHNICAL FIELD OF THE INVENTION

The technical field of this invention is processor and memory power control technology.

BACKGROUND OF THE INVENTION

As embedded DSP solutions are facing stringent power consumption requirements to prolong battery life or to minimize power dissipation for thermal issues, it is important to minimize power dissipation in all possible cases. One opportunity for this is to allow the embedded processor "core" and any embedded memory or megamodule to enter a power-savings mode whenever it enters a period of inactivity. This allows for power savings whenever the processor or associated memories are not required to actively process or receive/provide data. When processing or data is required, selected segments of the core, memory or module re must be brought out of this low-power state as required by the system.

SUMMARY OF THE INVENTION

The Generalized Embedded Megamodule (GEM), along with the embedded Joule CPU provides a power-saving mechanism through a combination of hardware and software. By configuring the power-down controller (PDC) logic within GEM, the Joule CPU can, through software, trigger a low-power state of the entire GEM during processor IDLE periods. The Joule CPU can execute an IDLE instruction, which in turn provides and idle status signal to the PDC. The PDC, upon observing that this IDLE state is reached, will power-down the entire GEM and its associated L1 and L2 cache memories.

To wake from this power-down state, a system event (any event assertion by a device pin or on-chip peripheral/co-processor) must be asserted to the CPU through the GEM interrupt controller. Thus the entry into a low-power state is software-driven, entered during periods of inactivity, and exited based on system activity that demands the attention of the CPU.

Additionally, the L1 and L2 memories plus their associated controllers will wake on demand for the memory resource. If the system attempts to read the memory contents while GEM is in a power-down state the unified memory controller (UMC) and the memory will be temporarily brought out of their low-power states so that the memory access can complete.

Alternately, GEM may be temporarily brought out of its low-power state whenever an emulation command is asserted to the processing unit. This is a requirement as an emulation command may access any of the processor resources and therefore must wake portions of the processor to complete this action. As emulation accesses do not require GEM for any processing functions, it is returned to its power-down state as soon as the emulation access is completed. The CPU is only returned to an active state if processing is required by the system.

This functionality maintains the functionality of the system without hangs while minimizing the power contribution of the DSP core.

BRIEF DESCRIPTION OF THE DRAWINGS

These and other aspects of this invention are illustrated in the drawings, in which.

DETAILED DESCRIPTION OF PREFERRED EMBODIMENTS

Figures 1, 1A:
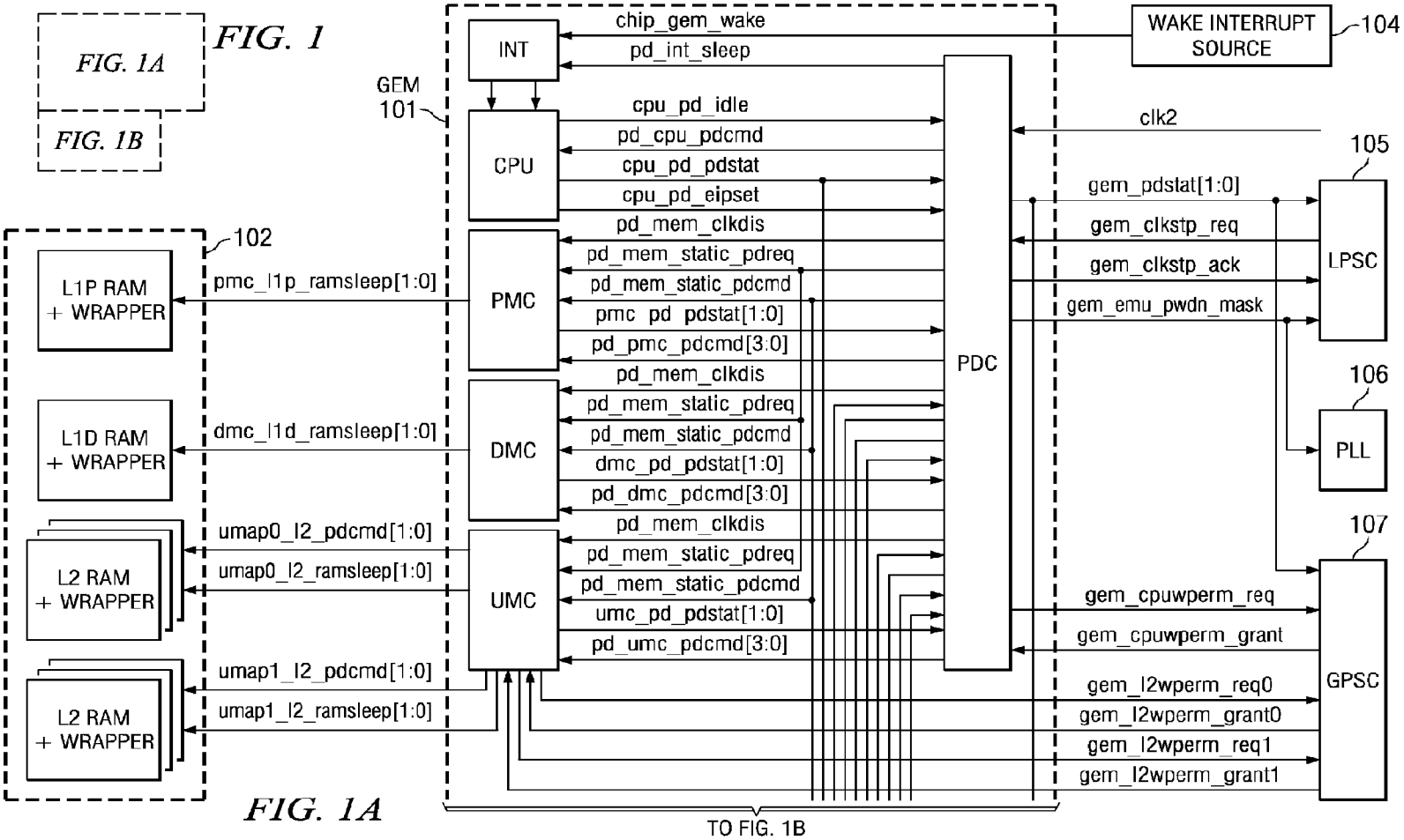
FIG. 1 shows a block diagram of the GEM module.
Figure 1B:
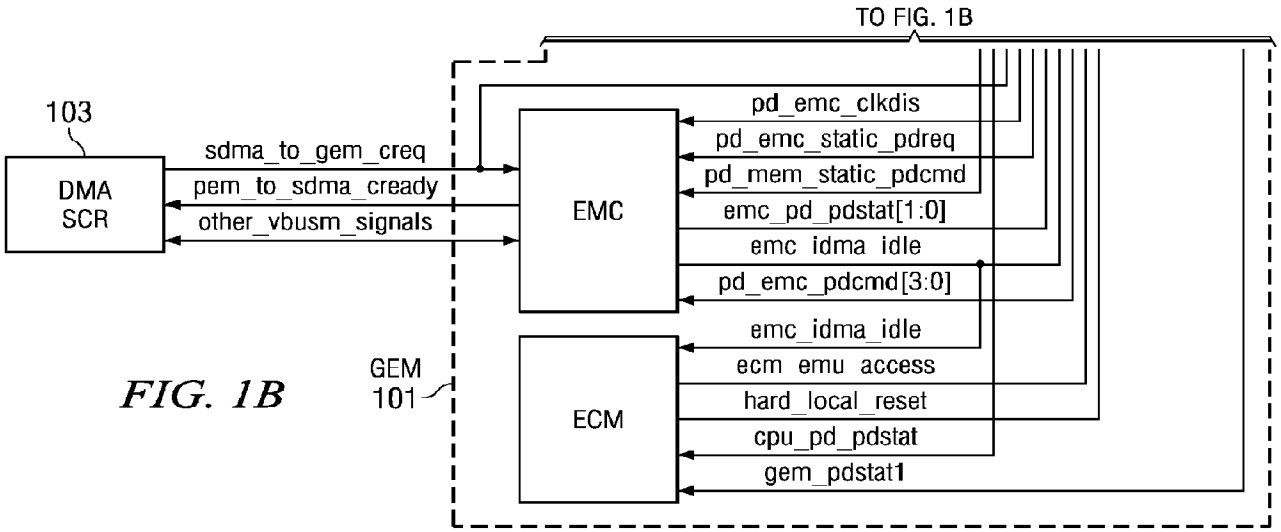

The following abbreviations are being used in the description:

| | |
|---|---|
| DMC | Data Memory Controller |
| PMC | Program Memory Controller |
| UMC | Unified Memory Controller |
| EMC | External Memory Controller |
| MPA | Memory Protection Arbitrator |
| PSC | Power/Sleep Controller |
| PDC | Power Down Controller |
| EDI | Emulation Data Interface |
| ECM | Emulation Control Module |
| UMAP | Unified Memory Access Port |
| SK | Secure Kernel |
| DAS | Debug Access Status |
| IDMA | Internal DMA |
| SDMA | Slave DMA |
| MDMA | Master DMA |
| LPSC | Local Sleep Controller |

Overview of the Power Down Process

The Generalized Embedded Megamodule (GEM) is designed with power consumption considerations in mind. To that effect, functionality within GEM can be disabled when not in use through either manual (either soft or hard) control or automatically.

Depending on configuration, several pieces of logic within GEM may need to be permanently powered-down. The following blocks can be powered down at chip-build time through GEM configuration (either e-fuse or tie-off). In addition, these blocks may be powered-down in software if not required by the application:

PMC:
- Tag RAMs & cache logic (if no L1P cache)
- Error detection logic (if not supported)
- Memory protection logic (if not supported)

DMC:
- Tag RAMs & cache logic (if no L1D cache)
- Memory protection logic (if not supported)

EMC:
- DMA port 1 (if only one DMA port)

UMC:

L2 controller (if no L2)

L2 Tag RAMs & cache controller (if no L2 cache)

Error detection and correction logic is powered down for devices that do not support EDC in L2

Memory protection logic (if not supported)

Emulation:

TCK domains when no emulator connected

Advanced emulation features: trace/AET (delta emulation between full & slim GEM)

In addition, several logic blocks within GEM have intelligent power control that can reduce power dissipation depending on the usage condition of the device. For the PMC, DMC, and UMC the memory controllers have the ability to dynamically put the RAMs to sleep to save power during periods of no access.

Blocks external to GEM (such as the DMA and device peripherals) will also require power-down control to manage power at the chip level as well. These will require either a power down controller within the chip (a PDC peripheral) or control within the peripherals themselves to manage this. The specific mechanism used to "power-down" a component or sub-component is defined in the micro-architecture. For the purposes of this document it is assumed that a powered-down block has its clocks gated. Other power-down mechanisms could range from controlling-down the clock to removing power rails.

Feature Overview

Table 1 shows the power-down features of the GEM module.

TABLE 1

Power-down Feature Control

| | Power-down through: | | |
|---|---|---|---|
| GEM (sub)component | Configuration (tie-off) | Operating mode (e.g. cache setting) | PDC control |
| CPU | No | No | Yes |
| PMC.cache | No | Yes | Yes |
| PMC.SRAM | No | No | Yes |
| PMC.MemoryProtection | No | Yes | Yes |
| PMC.ErrorDetection | No | Yes | Yes |
| DMC.cache | No | Yes | Yes |
| DMC.SRAM | No | No | Yes |
| DMC.MemoryProtection | No | Yes | Yes |
| UMC.cache | Yes (no L2) | Yes | Yes |
| UMC.SRAM | Yes (no L2) | No | Yes |
| UMC.MemoryProtection | Yes (no L2) | Yes | Yes |
| UMC.ErrorDetection | Yes (no L2) | Yes | Yes |
| UMC.AtomicMonitors | Yes (no L2) | Yes | Yes |
| EMC.IDMA | Yes (no L2) | No | Yes |
| INT | No | No | Yes |
| EMU | Yes (no adv emu) | No | No |
| Reset | No | No | No |

GEM Power-Down Capability

Power-down of GEM components can be established at chip-build time either through tie-offs or through e-fuse configuration. Components and sub-components are powered down completely at the chip level if they are not supported. Additionally, components within GEM can respond to configuration settings during device operation to power-down portions of the logic to save power. Each GEM component specification documents the specific portions that can be permanently powered-off. All components are summarized below.

PMC Power-Down Support

Within the PMC, there are three functional blocks that can be "removed" from a chip: cache control, error detection logic, and memory protection logic. If any of these are not supported for a device the PMC will gate the clocks to these logic blocks so that they do not contribute to the device power consumption.

The sub-components within the PMC can be powered-off through several means. They can be permanently disabled based by tie-offs to indicate they are never present in the chip; they can be disabled based on a software setting (feature is disabled in a PMC control register); or they can be disabled based on inputs from the power-down controller.

L1P Cache Power-Down

When no L1P cache is present on a device (either it is not possible in the specific device, or the PMC is programmed to be all SRAM) then there is no benefit to powering the cache logic or TAG RAMs. If present, these can be powered-down with the clocks gated to remove their power contribution to the chip.

The clock is gated to the cache control logic and tags when the PMC cache mode is set (by software) to all-SRAM. The start-up setting of the PMC is set at chip-build time either through tie-offs or e-fuse either to all-SRAM or max-cache (up to 32 KB). The user cannot power down the cache control and TAG RAMs directly. This is always a function of whether or not the cache is enabled.

L1P Error Detection Power-Down

Additionally, clocks can be gated to the error detection logic and associated parity RAM (if separate from the L1P RAMs) to remove their contribution. Error detection is enabled and disabled in software in a PMC control register. When disabled, fetch packets from L1P (either SRAM or cache) are not checked with their associated parity bit for a bit error. Likewise the parity bit is not set by the hardware as the L1P SRAM or cache contents are filled. This means that any bit errors will go undetected while this logic is disabled and powered-down.

L1P Memory Protection Power-Down

The memory protection logic can be disabled as well, which prevents checks on the memory accesses made from the CPU, UMC, and EMC. When disabled, any requester will be able to read, write, or execute any of the contents within L1P. Memory protection is enabled and disabled in a PMC control register.

DMC Power-Down

Within the DMC, there are two functional blocks that can be "removed" from a chip: cache control and memory protection logic. If either of these is not supported for a device the DMC will gate the clocks to these logic blocks so that they do not contribute to the device power consumption.

The sub-components within the DMC can be powered-off through several means. They can be permanently disabled based on tie-offs to indicate they are never present in the chip; they can be disabled based on a software setting (feature is disabled in a DMC control register); or they can be disabled based on inputs from the power-down controller.

L1D Cache Power-Down

When no L1D cache is present on a device (either it is not possible in the specific device, or the DMC is programmed to be all SRAM) then there is no benefit to powering the cache logic or TAG RAMs. If present, these can be powered-down with the clocks gated to remove their power contribution to the chip.

The clock is gated to the cache control logic and tags when The DMC cache mode is set (by software) to all-SRAM. The start-up setting of the DMC is set at chip-build time either through tie-offs or e-fuse either to all-SRAM or max-cache (up to 32 KB). The user cannot power down the cache control and TAG RAMs directly. This is always a function of whether or not the cache is enabled.

L1D Memory Protection Power-Down

The memory protection logic can be disabled as well, which prevents checks on the memory accesses made from the CPU, UMC, and EMC. When disabled, any requester will be able to read, write, or execute any of the contents within L1D. Memory protection is enabled and disabled in a DMC control register.

UMC Power-Down

The unified memory controller (UMC) provides a bridge between the L1 and L2 controllers and the extended memory controller (EMC). Within the UMC are the cache control registers for management of L1 and L2 cache operations, the L2 SRAM controller, L2 cache controller, memory protection logic, error detection and correction (EDC) logic, and access monitors for L2 page 0.

The sub-components within the UMC can be powered-off through several means. They can be permanently disabled based on tie-offs to indicate they are never present in the chip; they can be disabled based on a software setting (feature is disabled in a UMC control register); or they can be disabled based on inputs from the power-down controller.

It is important to note that the two L2 pages within the UMC are completely independent from one another. Therefore those sub-components present for both L2_0 and L2_1 can be powered-down independently between the two. This statement applies to memory protection and SRAM control. There is a single cache controller regardless of the number of L2 pages present.

L2 Cache Power-Down

When no L2 cache is present on a device (either it is not possible in the specific device, or the UMC is programmed to be all SRAM) then there is no benefit to powering the cache logic or TAG RAMs. If present, these can be powered-down with the clocks gated to remove their power contribution to the chip.

The clock is gated to the cache control logic and tags when the L2 cache mode is set (by software) to all-SRAM. The start-up setting of the UMC is set at chip-build time either through tie-offs or e-fuse either to all-SRAM or max-cache. The user cannot power down the cache control and TAG RAMs directly. This is always a function of whether the cache is enabled or not.

L2 Error Detection and Correction Power-Down

EDC is an optional feature within the UMC for L2 page 0. If EDC is not supported on a device, then this block is powered down. Likewise, if EDC is disabled via software, the EDC controller is powered down and the clock to the parity RAMs is gated.

L2 Memory Protection Power-Down

The memory protection logic is an optional feature for L2 page 0 as well, and can be disabled to prevent checks on the memory accesses. When disabled, any requester will be able to read, write, or execute any of the contents within L2. Memory protection is disabled in a UMC control register.

EMC Power-Down

The EMC provides a bridge between the DMA and the L1 and L2 memories. In addition, the EMC contains the internal DMA controller that facilitates paging between GEM local memories. If a DMA port is not present in the EMC (GEM allows for a plurality of DMA ports) then the logic associated with that port must be powered down.

In addition, the EMC can be configured in different ways that may allow for reduced power dissipation. The DMA port widths are configurable through tie-offs to different sizes (32, 64, and 128 bit). Reducing the DMA port width will reduce the power dissipation.

Power Down Controller

GEM supports several temporary power-down states to facilitate reduced power dissipation during run-time. To facilitate this, GEM includes a power-down controller (PDC) module that allows power-down management through software control. This provides a means to enter sleep states during periods of limited or no CPU activity.

In order to allow an external master of the CPU, the PDC provides power control inputs to receive power management requests either from an on-chip controller or an external host. The CPU can enter and exit power-down states either on its own or based on input from such a controller.

Individual GEM components—the CPU, PMC, DMC, UMC, and EMC—can be powered-down via the PDC. The PDC has a set of control signals going to each component that informs it to enter a static power-down state. When a power-down request is issued to a GEM component an acknowledge signal must be returned to the PDC once that power-down state is attained. Additionally, the PDC informs each component what modal and dynamic power-down is supported in GEM, including module clock gating and L1/L2 RAM sleep modes.

All PDC registers are writeable only when the CPU is in Supervisor mode, or is Secure Supervisor on a secure device. Registers are readable regardless of Secure/non-secure Supervisor/User status. Emulation can read or write all registers. Note that memory protection attributes are handled within the EMC.

The power-down controller (PDC) within GEM allows the CPU to program the desired power-down state of various megamodule components. Within the PDC there are several registers, as shown in Tables 2 and 3.

TABLE 2

PDC Register

| Register | Address | Description |
|---|---|---|
| PDCCMD | 0x01810000 | Power-down command register. Power-down control bits to the CPU, PMC, DMC, UMC, and EMC for clock gating and RAM sleep mode support. Selects the power-down behavior of GEM. |

A generalized block diagram of the Power-down controller is shown in FIG. 1, where block 101 shows the GEM megamodule, 102 is the block containing the various memories, 103 shows the DMA controller, 104 is the wake interrupt source, 105 is the Local Sleep Controller. 106 shows the clock controller phase locked loop and 107 shows the general sleep controller block.

GEM PDC Command Register

The power-down attributes of the GEM components are mapped through the PDC. The mapping is achieved through a PDCCMD register, shown in Table 3.

TABLE 3

| Power-Down Command Register (PDCCMD) | | | | | | | | | | | | | | | | | | | |
|---|---|---|---|---|---|---|---|---|---|---|---|---|---|---|---|---|---|---|---|
| 31 | 17 | 16 | 15 | 14 | 13 | 12 | 11 | 10 | 9 | 8 | 7 | 6 | 5 | 4 | 3 | 2 | 1 | 0 |
| Reserved R, +000000000000000 | | GEMPD RW, +0 | EMCMEM RW, +v | | EMCLOG RW, +x | | UMCMEM RW, +w | | UMCLOG RW, +x | | DMCMEM RW, +z | | DMCLOG RW, +x | | PMCMEM RW, +y | | PMCLOG RW, +x | |

The reset values of the PDCCMD fields are based off of tie-offs to GEM. These tie-offs set the supported clock gating and RAM sleep modes, as shown in tables 4, 5 and 6.

TABLE 4

| Logic Clock Gating Support | | | |
|---|---|---|---|
| pdc_clkg_dis | xMCLOG Reset Value | Permitted Values | Description |
| 0 | 01 | Any | Clock gating supported. Programmable in PDCCMD. |
| 1 | 00 | 00 | Clock gating override. PDCCMD.xMCLOG read-only. |

TABLE 5

| RAM Sleep Modes Support | | | | | | | | | |
|---|---|---|---|---|---|---|---|---|---|
| | Reset Value | | | | Permitted Values | | | | |
| pdc_ramsleep | EMCMEM | UMCMEM | DMCMEM | PMCMEM | EMCMEM | UMCMEM | DMCMEM | PMCMEM | Description |
| 00 | 01 | 01 | 01 | 01 | Any | Any | Any | Any | All SRAM sleep modes supported, as programmed in PDCCMD.-xMCMEM |
| 01 | 01 | 01 | 00 | 01 | Any | Any | 00 | Any | L1D sleep override. PDCCMD.-DMCMEM read-only. |
| 10 | 01 | 01 | 00 | 00 | Any | Any | 00 | 00 | L1 sleep override. PDCCMD.-PMCMEM, PDCCMD.-DMCMEM read-only. |
| 11 | 00 | 00 | 00 | 00 | 00 | 00 | 00 | 00 | RAM sleep override. PDCCMD.-xMCMEM read-only. |

The PDCCMD register pertains to both the active and standby state of GEM. The default value of the PDCCMD register is set through tie-offs to GEM, as explained in table 3. It is expected that the tie-off values be set in e-Fuse at the chip level for ease of modification, though this is not a requirement.

The PDCCMD bits correspond to the clock gating functionality supported both within and to each of the GEM components as well as to the SRAM sleep modes supported to the L1 and L2 memories. The bit mapping and functionality is shown in the following table 6.

TABLE 6

| PDCCMD Register Fields | |
|---|---|
| Field | Description |
| PMCLOG | Logic Clock Gating Modes. Determines to what degree the PMC gates its clock internally. The default and allowable values of PMCLOG are determined by the GEM tie-off pdc_clkg_dis. Note that on GEM 1.0 only bit 0 is |

TABLE 6-continued

| PDCCMD Register Fields | |
|---|---|
| Field | Description |
| | implemented and bit 1 is reserved and tied to 0.<br>00: No clock gating supported beyond leaf clock gating. (Override)<br>01: Static clock gating of unused modules regions when GEM is active (pmc_pd_pdstat[1:0] = 00) and Static clock gating to the PMC when GEM is in standby (pmc_pd_pdstat[1:0] = 11). (default) |
| PMCMEM | SRAM Sleep Modes. Determines the RAM sleep modes used by the PMC for powering-down L1P pages. The |

TABLE 6-continued

| PDCCMD Register Fields | |
|---|---|
| Field | Description |
| | default and allowable values of PMCMEM are determined by the GEM tie-off pdc_ramsleep[1:0]. Sleep mode values must be decoded at the chip level. Note that on GEM 1.0 only bit 0 is implemented and bit 1 is reserved and tied to 0.<br>00: No sleep mode supported (Override)<br>01: Sleep mode 1. L1P defined at chip-level. |
| DMCLOG | Logic Clock Gating Modes. Determines to what degree the DMC gates its clock internally. The default and allowable values of DMCLOG are determined by the GEM tie-off pdc_clkg_dis. Note that on GEM 1.0 only bit 0 is implemented and bit 1 is reserved and tied to 0.<br>00: No clock gating supported (Override)<br>01: Static clock gating of unused modules regions when GEM is active (dmc_pd_pdstat[1:0] = 00) and Static clock gating to the DMC when GEM is in standby (dmc_pd_pdstat[1:0] = 11). (default) |

TABLE 6-continued

| PDCCMD Register Fields | |
|---|---|
| Field | Description |
| DMCMEM | SRAM Sleep Modes. Determines the RAM sleep modes used by the DMC for powering-down L1D pages. The default and allowable values of DMCMEM are determined by the GEM tie-off pde_ramsleep[1:0]. Sleep mode values must be decoded at the chip level. Note that on GEM 1.0 only bit 0 is implemented and bit 1 is reserved and tied to 0.<br>00: No sleep mode supported (Override)<br>01: Sleep mode 1. L1D defined at chip-level. |
| UMCLOG | Logic Clock Gating Modes. Determines to what degree the UMC gates [it's] *its* clock internally. The default and allowable values of UMCLOG are determined by the GEM tie-off pdc_clkg_dis. Note that on GEM 1.0 only bit 0 is implemented and bit 1 is reserved and tied to 0.<br>00: No clock gating supported (Override)<br>01: Static clock gating of unused modules regions when GEM is active (umc_pd_pdstat[1:0] = 00) and Static clock gating to the UMC when GEM is in standby (umc_pd_pdstat[1:0] = 11). (default) |
| UMCMEM | SRAM Sleep Modes. Determines the RAM sleep modes used by the UMC for powering-down L2 pages. The default and allowable values of UMCMEM are determined by the GEM tie-off pdc_ramsleep[1:0]. Sleep mode values must be decoded at the chip level. Note that on GEM 1.0 only bit 0 is implemented and bit 1 is reserved and tied to 0.<br>00: No sleep mode supported (Override)<br>01: Sleep mode 1. L2 defined at chip-level. |
| EMCLOG | Logic Clock Gating Modes. Determines to what degree the EMC gates [it's] *its* clock internally. The default and allowable values of EMCLOG are determined by the GEM tie-off pdc_clkg_dis. Note that on GEM 1.0 only bit 0 is implemented and bit 1 is reserved and tied to 0.<br>00: No clock gating supported (Override)<br>01: Static clock gating of unused modules regions when GEM is active (emc_pd_pdstat[1:0] = 00) and Static clock gating to the EMC when GEM is in standby (emc_pd_pdstat[1:0] = 11). (default) |
| EMCMEM | SRAM Sleep Modes. Determines the RAM sleep modes used by the EMC for powering-down L2 pages. The default and allowable values of EMCMEM are determined by the GEM tie-off pdc_ramsleep[1:0]. Sleep mode values must be decoded at the chip level. Note that on GEM 1.0 only bit 0 is implemented and bit 1 is reserved and tied to 0.<br>00: No sleep mode supported (Override)<br>01: Sleep mode 1. |
| GEMPD | Power-down during IDLE.<br>GEMPD = 0: Normal operation. Do not power-down CPU or GEM when CPU is IDLE.<br>GEMPD = 1: Sleep mode. Power-down CPU and GEM when CPU enters IDLE state. |

The logic clock gating fields (PDCCMD.xMCLOG) allow the modal clock gating that is implemented within GEM to be overridden or enhanced. By default, all GEM components will internally gate clocks to all disabled logic, as described in Section 0. A value of '00' in any of the xMCLOG fields will override this clock gating in the corresponding module and a value of '10' or '11' would enable more aggressive, dynamic clock gating to logic areas. This dynamic clock gating is currently not supported in GEM and is reserved for ftiture enhancements.

Additionally, when GEM is in a static power-down state (standby) the clocks are gated to each of the GEM components. If the PDCCMD.xMCLOG field is set to '00' then this static clock gating is overridden and the clock stays active to the components when in standby.

The RAM sleep mode fields (PDCCMD.xMCMEM) allow control of the SRAM sleep modes supported by the memory controllers. By default, all memory controllers can put their RAMs in a sleep mode. A value of '00' will override this support and prevent the controllers from putting their RAMs to sleep. For all internal RAMs in a GEM component, a non-zero value will allow the RAMs to be placed in a sleep-with-retention mode. For external RAMs, the PDCCMD.xMCMEM bits are passed through the components, which in turn provide these values, unmodified, to GEM output terminals. It is required that these values are decoded to corresponding sleep/power-down signals to the RAMs at the chip level. It is assumed that '00' will always mean awake and active, with other values being established in the appropriate chip specification.

GEM Power-Down Signals

The PDC has several pins that are connected to various GEM (and chip) components, shown in the table 7, that are described in the following sections.

TABLE 7

| PDC Pin List | | | |
|---|---|---|---|
| Signal | Dir | To/From | Description |
| PDC Tie-offs | | | |
| pdc_clkg_dis | In | Tie-off | Clock gating support<br>pdc_clkg_dis = 0: Clock gating supported.<br>pdc_clkg_dis = 1: Clock gating override. |
| pdc ramsleep[1:0] | In | Tie-off | Power-down status<br>pdc_ramsleep = 00: RAM sleep supported in all components.<br>pdc_ramsleep = 01: L1D override. RAM sleep supported in all but DMC.<br>pdc_ramsleep = 10: L1 override. RAM sleep supported in all but DMC and PMC.<br>pdc_ramsleep = 11: RAM sleep override.<br>Not supported by any components |
| GEM Status | | | |
| gem_pdstat[1:0] | Out | Chip power control, ECM | Power-down status<br>gem_pdstat = 00: Active. GEM is fully powered-up.<br>gem pdstat = 01: Reserved.<br>gem pdstat = 10: Transitioning between Active and Standby states in progress. Also indicates that a slave DMA or emulation access is being serviced.<br>gem_pdstat = 11: Standby. GEM is powered-down. Will wake on enabled interrupt to the CPU and will service slave DMA commands normally (with latency), if gem_clkstp_ack is not asserted. |
| CBA Handshaking Signals | | | |
| gem_clkstp_req | In | Chip power control (LPSC) | Clock stop request.<br>gem_clkstp_req = 0: Clock stop is not requested to GEM.<br>gem clkstp req = 1: Clock stop is requested to GEM pd_in_sleep is pulsed high |

TABLE 7-continued

| PDC Pin List | | | |
|---|---|---|---|
| Signal | Dir | To/From | Description |
| | | | for one clk2 cycle to begin power-down sequence, after which gem_clkstp_ack is asserted. |
| gem_clkstp_ack | Out | Chip power control (LPSC) | Clock stop acknowledge. gem_clkstp_ack = 0: No acknowlegement to gem_clkstp req. It is not permissible to stop the clock to GEM. gem_clkstp_ack = 1: Acknowlegement to gem_clkstp_req. It is permissible to stop the clock to GEM. |
| gem_emu_pwdn_mask (wakeup) | Out | Chip power control (LPSC) | Wake-up request for emulation access. gem_emu_pwdn_mask = 0: No request to remove gem_clkstp_req. gem_emu_pwdn_mask = 1: Request to remove gem_clkstp_req. |
| Power-up Sequencing Signals | | | |
| gem_cpuwperm_req | Out | Chip power control (GPSC) | Wake permission request. gem cpuwperm_req = 0: Permission to release GEM from power-down not requested. gem_cpuwperm_req = 1: Permission to release GEM from power-down is requested. GEM is not released until gem_wperm_grant is received. |
| gem_cpuwperm_grant | In | Chip power control (GPSC) | Wake permission grant. Note that assertions in response to gem_cpuwperm_req must be a single clk2 cycle wide. gem_cpuwperm_grant = 0: Permission to release GEM (CPU) from power-up is not granted. gem_cpuwperm_grant = 1: Permission to release GEM (CPU) from power-up is granted. |
| gem_l2wperm_req0 | Out (from UMC) | Chip power control (GPSC) | UMAP0 Wake permission request. gem_l2wperm_req0 = 0: Permission to release L2 page from sleep mode not requested. gem_12wperm_req0 = 1: Permission to release L2 page from sleep mode is requested. L2 is not released until gem_wperm_grant0 is received. |
| gem_l2wperm_grant0 | In (to UMC) | Chip power control (GPSC) | UMAP0 Wake permission grant. Note that assertions in response to gem_l2wperm_req0 must be a single clk2 cycle wide. gem_l2wperm_grant0 = 0: permission to release L2 page from sleep mode is not granted. gem_l2wperm_grant0 = 1: Permission to release L2 page from sleep mode is granted. |

TABLE 7-continued

| PDC Pin List | | | |
|---|---|---|---|
| Signal | Dir | To/From | Description |
| gem_l2wperm_req1 | Out (from UMC) | Chip power control (GPSC) | UMAP1 Wake permission request. gem_l2wperm_req1 = 0: Permission to release L2 page from sleep mode not requested. gem_l2wperm_req1 = 1: Permission to release L2 page from sleep mode is requested. L2 is not released until gem_wperm_grant1 is received. |
| gem_l2wperm_grant1 | In (to UMC) | Chip power control (GPSC) | UMAP1 Wake permission grant. Note that assertions in response to gem_l2wperm_req1 must be a single clk2 cycle wide. gem_l2wperm_grant1 = 0: Permission to release L2 page from sleep mode is not granted. gem_l2wperm_grant1 = 1: Permission to release L2 page from sleep mode is granted. |
| CPU Handshaking Signals | | | |
| cpu_pd_idle | In | CPU | CPU IDLE status cpu_pd_idle = 0: CPU is not idle cpu_pd_idle = 1: CPU is idle |
| pd_cpu_pdccmd | Out | CPU | Command to power-down the CPU. pd_cpu_pdccmd = 0: Wake command to CPU pd_cpu_pdccmd = 1: Power-down command to CPU |
| cpu_pd_pdstat | In | CPU (ECM) | Acknowledge that the CPU is powered-down. cpu_pd_pdstat = 0: CPU is awake cpu_pd_pdstat = 1: CPU is powered-down |
| cpu_pd_eipset | In | CPU | Enabled interrupt status cpu_pd_eipset = 0: CPU does not have an enabled interrupt pending. cpu_pd_eipset = 1: CPU has an enabled interrupt pending. |
| Global Memory Power-down Commands | | | |
| pd_mem_static_pdreq | Out | PMC, DMC, UMC | Static power-down request to memory subsystem pd_mem_static_pdreq = 0: Normal operation pd_mem_static_pdreq = 1: GEM entering static power-down. Components to acknowledge when ready to be powered-down through <component> _pd_pdstat[10] = 01. |
| pd_mem_static_pdccmd | Out | PMC, DMC, UMC, EMC | Static power-down command. pd_mem_static_pdccmd = 0: Wake command to PMC, DMC, UMC, EMC. GEM is leaving/not in static power-down. pd_mem_static_pdccmd = 1: Power-down command to PMC, DMC, UMC, EMC. GEM is entering/in static |

TABLE 7-continued

| PDC Pin List | | | |
|---|---|---|---|
| Signal | Dir | To/From | Description |
| | | | power-down. Components to acknowledge when powered-down through <compo-nent>_pd_pdstat[1:0] = 11. |
| Memory Wake-to-access Counters | | | |
| gem_l1p_wakecnt | In (to PMC) | tie-off | 5-bit DP wake-to-access counter. Refer to PMC specification. gem_l1p_wakecnt = xxxxxb: Wake-to-access count for UMAP0 L2 RAMs is xxxxxb clk1 cycles. |
| gem_l1d_wakecnt | In (to DMC) | tie-off | 5-bit Ll D wake-to-access counter. Refer to DMC specification. gem_l1d_wakecnt = xxxxxb: Wake-to-access count for UMAP0 L2 RAMs is xxxxxb clkl cycles. |
| gem_l2_wakecnt0 | In (to UMC) | tie-off | 7-bit UMAP 0 wake-to-access counter. Refer to UMC specification. gem_l2_wakecnt0 = xxxxxb: Wake-to-access count for UMAP0 L2 RAMs is xxxxx00b clk2 cycles. |
| gem_l2_wakecntl | In (to UMC) | tie-off | 7-bit UMAP 1 wake-to-access counter. Refer to UMC specification. gem_l2_wakecnt0 = xxxxxb: Wake-to-access count for UMAP1 L2 RAMs is xxxxx00b clk2 cycles. |
| gem_pstatic_cfg_update | In (to PMC, DMC, UMC) | Chip logic, if imple-mented | Counter setting update. gem_pstatic_cfg_update = 0: Wake count tie-offs unchanged. gem_pstatic_cfg_update = 0: Wake count tie-offs changed. Latch new config. |
| PMC Handshaking Signals | | | |
| pd_pmc_pdccmd[3:0] | Out | PMC | Power-down mapping for the PMC and L1P pd_pmc_pdccmd = 0000: Override. No clock gating or RAM sleep modes supported. pd_pmc_pdccmd = 0101: Default. Clock gating and RAM sleep mode 1 supported. pd_pmc_pdccmd = other: See Section 0 for details. |
| pmc_pd_pdstat[1:0] | In | PMC | PMC powered-down status in response to pd_mem_static_pdreq and pd_mem_static_pdccmd. pmc_pd_pdstat = 00: PMC is awake pmc_pd_pdstat = 01: PMC is IDLE and ready for power-down pmc_pd_pdstat = 10: PMC is servicing a request during power-down |

TABLE 7-continued

| PDC Pin List | | | |
|---|---|---|---|
| Signal | Dir | To/From | Description |
| | | | pm_cpd_pdstat = 11: PMC is powered-down and ready for clock to be gated |
| pd_pmc_clkdis | Out | PMC | PMC clock disable pd_pmc_clkdis = 0: Clock enabled. pd_pmc_clkdis = 1: Clock disabled. |
| DMC Handshaking Signals | | | |
| pd_dmc_pdccmd[3:0] | Out | DMC | Power-down mapping for the DMC and LTD pd_dmc_pdccmd = 0000: Override. No clock gating or RAM sleep modes supported. pd_dmc_pdccmd = 0101: Default. Clock gating and RAM sleep mode 1 supported. pd_dmc_pdccmd = other: See Section 0 for details. |
| dmc_pd_pdstat[1:0] | In | DMC | DMC powered-down status in response to pd_mem_static_pdreq and pd_mem_static_pdccmd. dmc_pd_pdstat = 00: DMC is awake dmc_pd_pdstat = 01: DMC is IDLE and ready for power-down dmc_pd_pdstat = 10: DMC is servicing a request during power-down dmc_pd_pdstat = 11: DMC is powered-down and ready for clock to be gated |
| pd_dmc_clkdis | Out | DMC | DMC clock disable pd_dmc_clkdis = 0: Clock enabled. pd_dmc_clkd s = 1: Clock disabled. |
| UMC Handshaking Signals | | | |
| pd_umc_pdccmd[3:0] | Out | UMC | Power-down mapping for the UMC and L2 pd_umc_pdccmd = 0000: Override. No clock gating or RAM sleep modes supported. pd_umc_pdccmd = 0101: Default. Clock gating and RAM sleep mode 1 supported. pd_umc_pdccmd = other: See Section 0 for details. |
| umc_pd_pdstat[1:0] | In | UMC | UMC powered-down status in response to pd_mem_static_pdreq and pd_mem_static_pdccmd. umc_pd_pdstat = 00: UMC is awake umc_pd_pdstat = 01: UMC is IDLE and ready for power-down umc_pd_pdstat = 10: UMC is servicing a request during power-down umc_pd_pdstat = 11: UMC is powered-down and ready for clock to be gated |
| pd_umc_clkdis | Out | UMC | UMC clock disable pd_umc_clkdis = 0: Clock enabled. pd_umc clkdis = 1: Clock disabled. |

TABLE 7-continued

| PDC Pin List | | | |
|---|---|---|---|
| Signal | Dir | To/From | Description |
| EMC Handshaking Signals | | | |
| pd_emc_static_pdreq | Out | EMC | Static power-down request. pd_emc_static_pdreq = 0: Normal operation pd_emc_static_pdreq = 1: GEM entering static power-down. EMC to acknowledge when ready to be powered-down through emc_pd_pdstat[1:0] = 01. |
| pd_emc_pdccmd[3:0] | Out | EMC | Power-down mapping for the EMC pd_emc_pdccmd = 0000: Override. No clock gating or RAM sleep modes supported. pd_emc_pdccmd = 0101: Default. Clock gating and RAM sleep mode 1 supported. pd_emc_pdccmd = other: See Section 0 for details. |
| emc_pd_pdstat[1:0] | In | EMC | EMC powered-down status in response to pd_mem_static_pdreq and pd_mem_static_pdccmd. emc_pd_pdstat = 00: EMC is awake emc_pd_pdstat = 01: EMC is IDLE and ready for power-down emc_pd_pdstat = 10: EMC is servicing a request during power-down emc_pd_pdstat = 11: EMC is powered-down and ready for clock to be gated |
| emc_idma_idle | In | EMC | IDMA idle status. emc_idma_idle = 0: IDMA has active or pending transfers. emc_idma_idle = 1: IDMA is IDLE |
| pd_emc_clkd s | Out | EMC | EMC clock disable pd_emc_clkdis = 0: Clock enabled. pd_emc_clkdis = 1: Clock disabled. |
| Interrupt Outputs | | | |
| pdc_int_sleep | Out | INT | Sleep event to the Interrupt controller pdc_int_sleep = 0: gem_clkstp_req has not been asserted high. pdc_int_sleep = 1: gem_clkstp_req has been asserted high. Interrupt pulsed high for one clk2 cycle to initiate power-down sequence for clock stop request. |
| Emulation Access Input | | | |
| ecm_emu_pwdn_mask | In | ECM | Emulation access mask ecm_emu_pwdn_mask = 0: No emulation access in progress/pending. ecm_emu_pwdn_mask = 1: Emulation access in progress/pending. |
| hard_local_reset | In | ECM | Reset (gated gresetz) hard_local_reset = 0: Reset asserted. hard local reset = 1: Reset not asserted. |
| Slave DMA Command Request | | | |
| sdma_to_gem_creq | In | SDMA | Slave DMA command request sdma_to_gem_creq = 0: No slave DMA command request pending. sdma_to_gem_creq = 0: Slave DMA command request pending. |
| gem_to_sdma_cready | Out | SDMA | Slave DMA command ready gem_to_sdma_cready = 0: No slave DMA command request pending. gem_to_sdma_cready = 0: Slave DMA command request pending. |

Generation of the above signals are defined in the micro-architecture.

GEM Power-Down Method

The initiation of a power-down sequence, by which GEM components are placed in a power-down state, is completely under local software control. Regardless of whether the decision to enter a power-down state is determined by the local CPU itself or a request is sent to the CPU by an external master (other CPU, on- or off-chip host, etc) the local CPU is responsible for programming the GEM power-down state to be entered as shown in Table 8.

TABLE 8

| GEM Component Power-Down Command | |
|---|---|
| PDCCMD.GEMPD | PDC action on IDLE |
| 0 | None. pd_cpu_pdccmd, pd_mem_static_pdreq, pd_emc_static_pdreq and pd_mem_static_pdcmd remain de-asserted. |
| 1 | Standby. pd_cpu_pdccmd is asserted to power-down the CPU. Following cpu_pd_pdstat = 1, the PDC will perform a power-down sequence with each of the components as defined in Section 0. Wakeup is triggered by an enable interrupt pending to the CPU. |

CPU Power-Down

The Joule CPU supports the ability to power-down based on a single input signal (pd_cpu_pdccmd). When this signal is asserted, the CPU gates its clocks to all but the power-down control logic and the interrupt logic. The CPU then asserts a status signal (cpu_pd_pdstat) indicating that it has completed its power-down sequence. The CPU performs no GEM- or chip-level power-down management. The GEM PDC does not support the legacy PD modes of the Texas Instruments C64× and C62× (set through the CSR CPU register). The CPU PD bits are exported outside of GEM, so a chip could support legacy modes outside of GEM if so desired.

The CPU initiates power-down simply by executing the IDLE instruction. When the CPU reports that it is executing the IDLE (cpu_pd_idle) instruction the PDC asserts the pd_cpu_pdccmd signal. The assertion of the power-down command and the wake-up method to return from power-down is based on the PDCCMD.CPUPD setting, as shown in the following table. The CPU ignores the pd_cpu_pdccmd signal when not in IDLE (cpu_pd_idle='0').

GEM Power-Down

The process by which other GEM components are powered down is also based on CPU activity and a software-configured setting in the PDC. The power-down commands to the PMC, DMC, UMC, and EMC is based upon the cpu_pd_idle status and the configuration in the PDCCMD register.

When the CPU is operating normally (cpu_pd_idle=0) the power-down commands to each of the GEM components are dictated by the settings in the PDCCMD register. Logic clock gating within the GEM modules are supported as defined in PDCCMD.xMCLOG.

RAM sleep modes are supported by the memory controllers (PMC, DMC, UMC, EMC) as defined in PDCCMD.xMCMEM.

When the CPU is in a standby state (cpu_pd_idle=1) the power-down commands to each of the GEM components are dictated by the settings in the PDCCMD register. The GEM components are then responsible to first enter the appropriate static power-down state and return an acknowledge signal back to the PDC. After all acknowledge signals are received by the PDC, the status is updated and broadcast out of GEM (to a chip-level power-down controller). GEM components are powered-down in a two-stage handshake to ensure all activity is completed before any clock gating occurs.

The PDC first broadcasts a pd_mem_static_pdreq command to inform all GEM memory controllers that a static power-down is being requested. Each of the components is responsible to update its <component>_pd_pdstat[1:0] status to the PDC indicating IDLE status (01b).

When all memory controllers are IDLE (Note that IDLE status may toggle between awake and idle for an individual component as it responds to on-going activity within other components) it is guaranteed that all CPU and user-initiated cache operations are completed and the PDC issues pd_emc_ static_pdreq command to the EMC. The EMC waits until no slave DMA commands are accepted or being serviced and updates its emc_pd_pdstat[1:0] status to the PDC indicating IDLE (10b). See Section 0 for additional detail on slave DMA command servicing.

The PDC then broadcasts a pd_mem_static_pdccmd command to place all GEM components in a power-down state. Each of the components is again responsible to update its <component>_pd_pdstat[1:0] signal back indicating power-down status (11b).

After the components are in power-down the PDC asserts the pd_<component>_clkdis command to each allowing them to internally gate their clocks.

The following sequence shows the process by which the GEM enters a new power-down mode.

The <component>_pd_pdstat[1:0] inputs from the various GEM components can toggle based on interaction between the components as activity completes. It is not until all ready inputs are high that GEM is IDLE and the PDC may put power-down GEM.

The PDC first ensures that all CPU activity has completed, including software driven cache coherency operations and IDMA, prior to requesting a power-down to the EMC. This is to minimize the time during which GEM stalls an external DMA. Following an idle status from the memory controllers the PDC requests the EMC to notify it when all slave DMA transactions complete.

Once all controllers are idle, the PDC globally issues the static power-down command. Additionally, GEM does not update its status output until all GEM components have reported that they are powered-down and the PDC has gated their clocks. If an emulation access or a slave DMA access occurs while in power-down the status reflects that a request is being serviced by showing the "transition state".

If an interrupt occurs early, after the CPU has powered-down, but before the rest of GEM has powered-down, the PDC must back-off the power-down sequence. Since the cpu_pd_eipset is asserted, the PDC will remove the pd_mem_static_pdcmd command to the GEM components, and will back out of power-down, in the same manner as described for wake-up.

PMC Power-Down

The PMC supports dynamic power-down of the L1P RAMs only during SPLOOP. Exact functionality should be documented in the micro-architecture specification, but it is expected that during execution from the SPLOOP buffer the PMC provides the L1P RAM with the RAM sleep signals (pd_pmc_pdccmd[3:2]) defined by PDCCMD.PMCMEM. The PMC must wake the RAMs upon exit from SPLOOP as the CPU resumes fetching from the L1P memory. The PMC requires a wake-to-access count to ensure that an access is not made to the L1P RAMs immediately following wake-up, as dictated by the specific RAMs implemented. It is expected that this count value be specified in the PMC micro-architecture, and should be set through GEM tie-offs to the PMC (pmc_wakecnt[4:0]).

The PMC supports static power-down, whereby the RAM sleep signals are asserted following the power-down command from the PDC (pd_mem_static_pdccmd). Additionally, the PMC will place all of its internal RAMs in a sleep-with-retention state. Note that both for internal and external RAMs, the PDCCMD.PMCMEM field must be set to a non-zero value. Otherwise the RAMs are not placed in a sleep state. The PMC internally gates its clock as appropriate and acknowledges back to the PDC that it can have its clock gated. If permitted by a non-zero value of PDCCMD.PMCLOG the PDC will gate the clock to the PMC.

When waking from a static power-down the CPU will immediately issue a fetch to the PMC, so the PMC will need to power-up the L1P RAMs. As mentioned above, the PMC must guarantee that a minimum wake-to-access time is met following the RAM wakeup.

When in a static power-down state and the EMC accepts a slave DMA command (see Section 0) the PDC wakes all memory controllers by re-enabling clocks (pd_pmc_clkdis=0) and de-asserting the static power-down command signal (pd_mem_static_pdccmd=0). To minimize power dissipation, the PMC should not wake the RAMs from their sleep state unless the DMA access is to the L1P memory. In other words the PMC should always wake the RAMS on access, if in a power-down state. When the DMA access is serviced the PDC will again power down the GEM components, as defined in Section 0.

DMC Power-Down

The DMC does not support any dynamic power-down of the L1D RAMs. Only static power-down is supported.

The DMC supports static power-down, whereby the RAM sleep signals are asserted following the power-down command from the PDC (pd_mem_static_pdccmd). Additionally, the DMC will place all of its internal RAMs in a sleep-with-retention state. Note that both for internal and external RAMs, the PDCCMD.DMCMEM field must be set to a non-zero value. Otherwise the RAMs are not placed in a sleep state. The DMC internally gates its clock as appropriate and acknowledges back to the PDC that it can have its clock gated. If permitted by a non-zero value of PDCCMD. DMCLOG the PDC will gate the clock to the DMC.

When waking from a static power-down the CPU will immediately issue a fetch to the DMC, so the DMC will need to power-up the L1D RAMs. As with the PMC, the DMC requires a wake-to-access count to ensure that an access is not made to the L1D RAMs immediately following wake-up, as dictated by the specific RAMs implemented. It is expected that this count value be specified in the DMC micro-architecture, and should be set through GEM tie-offs to the DMC (dmc_wakecnt[4:0]).

When in a static power-down state and the EMC accepts a slave DMA command (see Section 0) the PDC wakes all memory controllers by re-enabling clocks (pd_dmc_clkdis=0) and de-asserting the static power-down command signal (pd_mem_static_pdccmd=0). To minimize power dissipation, the DMC should not wake the RAMs from their sleep state unless the DMA access is to the L1D memory. E.g. the DMC should always wake the RAMs on access, if in a power-down state. When the DMA access is serviced the PDC will again power down the GEM components.

UMC Power-Down

The UMC supports dynamic power-down of the L2 RAMs during normal operation. Exact functionality is described in detail in the UMC architecture and micro-architecture specifications. Refer also to Section 0 for sequencing behavior with the dynamic L2 sleep modes. The UMC provides the L2 RAM with the RAM sleep signals (pd_umc_pdccmd[3:2]) defined by PDCCMD.UMCMEM when powering down L2 pages. The UMC wakes the RAMs either on access or when directed to do so through UMC control registers. As with the PMC and DMC, the UMC guarantees that a minimum wake-to-access time is met following a wake-up. Each UMAP of the UMC should have its own count value specified through tie-offs to the UMC. This should be specified in the UMC micro-architecture (umc_p0_wakecnt[4:0] and (umc_p1_wakecnt[4:0]).

The UMC supports static power-down, whereby the RAM sleep signals are asserted following the power-down command from the PDC (pd_mem_static_pdccmd). Additionally, the UMC will place all of its internal RAMs in a sleep-with-retention state. Note that both for internal and external RAMs, the PDCCMD.UMCMEM field must be set to a non-zero value. Otherwise the RAMs are not placed in a sleep state. The UMC internally gates its clock as appropriate and acknowledges back to the PDC that it can have its clock gated. If permitted by a non-zero value of PDCCMD.UMCLOG the PDC will gate the clock to the UMC.

When waking from a static power-down the CPU will immediately issue a fetch to the UMC, so the UMC will need to power-up the L2 RAMs.

When in a static power-down state and the EMC accepts a slave DMA command the PDC wakes all memory controllers by re-enabling clocks (pd_dmc_clkdis=0) and de-asserting the static power-down command signal (pd_mem_static_pdccmd=0). To minimize power dissipation, the UMC should not wake the RAMs from their sleep state unless the DMA access is to the L2 memory. E.g. the UMC should always wake the RAMs on access, if in a power-down state. When the DMA access is serviced the PDC will again power down the GEM components.

The UMC allows for communication with a shared memory controller (SMC) outside of GEM. It is expected that the SMC implement similar control for managing dynamic and static power-down of its memory, using the command and RAM sleep outputs from the UMC. The SMC is expected to handshake directly with an external controller, rather than rely on the UMC for permission. This is detailed in the UMC architecture specification.

EMC Power-Down

The EMC has no external RAM, and therefore does not have any dynamic power-down support.

The EMC supports static power-down, whereby it will place all of its internal RAMs in a sleep-with-retention state. Note that the PDCCMD.EMCMEM field must be set to a non-zero value. Otherwise the RAMs are not placed in a sleep state. The EMC internally gates its clock as appropriate and acknowledges back to the PDC that it can have its clock gated. If permitted by a non-zero value of PDCCMD.EMCLOG the PDC will gate the clock to the EMC.

The EMC is fully powered-down whenever GEM is in a static powered-down state. When entering its power-down state it is necessary that the EMC de-assert its command ready (gem_to_sdma_cready=0, see the GEM EMC and VBUSM&P Usage specification for VBUS signal definitions) to hold off accepting new DMA commands. Once the command ready is de-asserted, the EMC notifies the PDC that it is in power-down, as shown in the following figure. Note that the command ready output from the EMC is synchronous to the DMA clock, which may be different than the EMC clock. The EMC must ensure that the command ready is de-asserted prior to updating the power-down status to the PDC.

Fully powering down the EMC is conditional on the status of the gem_clkstp_req input. If a clock stop request is in progress (e.g. gem_clkstp_req is high) then the EMC is clock gated by the PDC as mentioned. If clock stop request is not in progress (e.g. gem_clkstp_req is low), then the EMC must keep the slave DMA port active to receive, and service commands. If a slave DMA command is received while GEM is in a static power-down state the EMC will notify the PDC, which will then wake all GEM memory controllers (but not external RAMs) from their sleep states to service the access. When the access is complete the memory controllers are immediately returned to their sleep states. When waking from a static power-down the EMC must immediately wake its internal RAMs.

Externally-Requested Power-Down

It is possible for the CPU to respond to an externally-driven power-down request. This is typically accomplished through an interrupt to the CPU. Exact implementation requirements must be specified at the chip-level, but the intended implementation is that an external master (either a chip-level power-down controller or an external host) generates an interrupt to the CPU. The CPU then determines the requested power-down state either based on a pre-determined condition or by reading a status register in the system (a register, internal memory location, etc). The CPU then programs the PDCCMD, as defined in section 0, and then executes the IDLE instruction to power-down. The power-down controller does support the clock stop request handshaking defined in CBA3.0. The handshaking is not required, and can be bypassed by tying gem_clkstp_req low.

The CBA signaling is supported by the Local Power/Sleep Controller (LPSC), which will typically be used in a DSP for managing clock and power domains. The LPSC is not required by GEM, and the signaling could be supported by a different controller. Note that it is not a requirement to use the LPSC or to follow the clock stop request handshaking, but in order to support the handshaking a software protocol must be followed[, as detailed in Section Error! Reference source not found . . .]. The clock stop request handshaking should be followed if the clock to GEM is to be gated.

Implementation without Clock Stop Request

Figure 2:
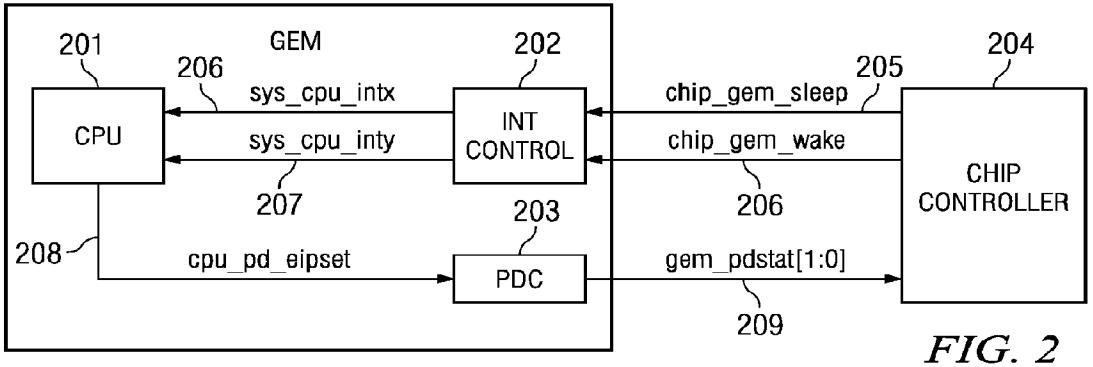
FIG. 2 shows a block diagram of a typical Power Down requester module.

If the CBA clock stop request signaling is not used (gem_clkstp_req tied low) then entering and exiting static power-down is based entirely on interaction between the CPU *201* and the PDC *203*. Communication with an external controller occurs through interrupt events to the GEM interrupt controller, with corresponding interrupt service routines to enter and exit power-down. It is acceptable to allow multiple sleep-request events and/or wake-request events from an external controller or controllers. A typical module hookup is shown in FIG. 2 where the external controller 204 communicates the sleep and wake requests on lines 205 and 206 to the internal controller 202. Said internal controller in turn generates sleep or wake interrupts to the CPU *201* on lines 206 and 207. The CPU *201* communicates [it's] *its* state to the PDC *203* over line 208. The PDC *203* then posts [it's] *its* status to the external controller 204 through line 209.

When the CPU receives the interrupt corresponding with entering power-down, it initiates a software sequence to:

1. Configure the PDCCMD register (if not already done)
2. Enable CPU interrupt(s) corresponding with wakeup and disable all others IDLE Instruction The GEM PDC responds to the IDLE status (cpu_pd_idle), GEM stays in its static power-down state until waken by the enabled interrupt(s). The EMC will service slave DMA commands. When the interrupt(s) are received, the PDC will perform the wake process and the CPU will immediately service the interrupt. Note that sequencing, if enabled, will require chip-level handshaking during this wakeup process.

The communication between an external power-down controller and GEM is through the interrupt controller only, and the expectation is simply that the interrupt corresponding to sleep precedes the sequence. The enabled interrupt status (cpu_pd_eipset) is asserted following the rising edge of a sleep-request event.

Clocks should not be gated if not using the clock stop request handshaking, as clocks are required to recognize system events and slave DMA commands.

Request

The PDC will translate the rising edge of gem_clkstp_req to a CPU interrupt (pd_int_sleep), and will complete the wake process. On receiving this interrupt, the CPU should perform the same steps defined in Section 0.

1. Configure the PDCCMD register (if not already done)
2. Enable CPU interrupt corresponding with chip_gem_wake and disable all others
3. Execute IDLE instruction The GEM PDC responds to the IDLE status (cpu_pd_idle) After the falling edge of gem_clkstp_req is seen, a chip-level component provides the GEM interrupt controller with a second interrupt (chip_gem_wake).

After the PDC has acknowledged to the external controller that it can have its clock gated, the external controller is free to halt the GEM clock. Note that if the clock to GEM is fully gated, then GEM will not recognize any interrupt pulses sent to the interrupt controller. If latching interrupts is required, then there must be chip logic outside of GEM that captures events when GEM's clock is gated. One option is for the external controller to slow, rather than gate the GEM clock and to synchronize the appropriate system events to the input clock (two-cycle pulse required). It is expected that GEM is removed from clock stop mode prior to any wake event being asserted.

If a clock stop request is received while GEM is already powered down, then GEM will immediately acknowledge (if no enabled interrupts are pending to the CPU) and acknowledge without interrupting the CPU. In other words, if gem_pdstat is '11' and gem_clkstp_req transitions from '0' to '1', and cpu_pd_eipset is '0', then gem_clkstp_ack will immediately be asserted to '1' and pd_int_sleep is not asserted to '1'.

Sequencing

The PDC supports a controlled power-up sequence to minimize the effects of powering up potentially large memory arrays, or the CPU, on the power grid. GEM can either immediately sequence through waking GEM L2 memory pages, or it can pause between each. Also, GEM will sequence between waking the CPU from static power-down and waking other chip components. Sequencing support outside of GEM requires a chip-level power-up arbiter to grant wake permission.

The signaling required for wake-up sequencing is supported by the Global Power/Sleep Controller (GPSC), which will typically be used in DSP for managing clock and power domains. The GPSC is not required by GEM, and the signaling could be supported by a different controller.

Sequencing is handled separately for wake-up from static power-down and for dynamic L2 RAM page wake-up. The former is handled by the PDC, while the latter is handled by the UMC directly. GEM therefore requires up to three sequencing ports to the GPSC.

If unneeded, sequencing can be disabled simply by tying gem_cpu_wperm_grant high for disabling sequencing wake-up from static power-down, and/or by tying gem_12wperm_grant[1:0] high for disabling sequencing dynamic L2 wake-up from sleep modes. If sequencing is performed, then the external controller (e.g. GPSC) must be GEM clk2 timed, as there is a strict requirement that the _grant signal is provided as a single clk2-cycle pulse.

The PDC will handshake with an external controller (e.g. GPSC) for wake-up from static power-down through the gem_cpuwperm_req and gem_cpuwperm_grant signals. When the PDC wants to complete the GEM power-up sequence by waking the CPU the PDC immediately asserts the gem_cpuwperm_req request signal to an external arbiter. When the gem_cpuwperm_grant grant signal is true (high), then the wake may proceed.

The UMC will handshake with an external controller (e.g. GPSC) for dynamic wake-up from L2 sleep modes through the gem_12wperm_req[1:0] and gem_12wperm_grant[1:0] signals, one req/grant pair per UMAP. When the UMC wants to wake an L2 page from sleep, it immediately asserts the gem_12wperm_req request signal to an external arbiter. When the gem_12wperm_grant grant signal is pulsed true (high), then the wake may proceed. Note that gem_cpuwperm_grant and/or gem_12_wperm_grant cannot be granted by default. Either the _grant signal(s) are tied statically high or they default low and pulse only in response to _req assertions by GEM. GEM will still provide the gem_cpuwperm_req and gem_12wperm_req outputs to inform the external controller when wakes are occurring. The external controller should have its own count values to manage arbitration, explained in the GPSC architecture specification. The request signals will pulse even if their respective grant signals are tied high.

The signaling required for wake-up sequencing is supported by the Global Power/Sleep Controller (GPSC), which will typically be used in DSP for managing clock and power domains. The GPSC is not required by GEM, and the signaling could be supported by a different controller.

Memory Wake-up Sequencing

The UMC will control the sequencing required when waking up L2 RAM pages. This is to ensure that the minimum time between waking up multiple pages is guaranteed, to avoid corrupting L2 memory contents. Note that to ensure that other chip-level components or memory are not corrupted, the chip level sequencing arbiter must guarantee the appropriate amount of time has elapsed between waking various chip components or memories.

The amount of time between waking RAM pages is controlled by the external controller (e.g. GPSC). Powering down and up the L2 pages is handled within the UMC, though a static power-down of the entire UMC, plus associated L2 RAM, is still initiated by the PDC (the UMC still handles the sequencing and wakeup of the RAMs). Each L2 page may be individually powered-up and -down by the UMC itself and the UMC must have permission from the external controller to wake a page, as signaled by gem_12wperm_grant (or gem_12wperm_grant is tied high).

If the external controller is gating RAM wakeup by de-asserting the gem_12wperm_grant signal to the UMC, the UMC requests permission to wake a page by asserting the gem_12wperm_req output. Once permission is granted to the UMC, the UMC will still guarantee that a minimum number of cycles have elapsed following the wake-up of the RAM before the access is permitted to proceed to ensure RAM specifications are met. The count value for this wake-to-access time is documented in the UMC architecture specification, and is dictated by the tie-off values provided to the UMC—gem_12_wakecnt0 and gem_12_wakecnt1. These tie-offs set the value for a 7-bit counter in the UMC to hold off accesses until the RAMs are awake. The tie-off values are latched during a global reset, or when gem_pstatic_cfg_update is asserted to '1'.

If the RAMs are sufficiently sized to permit, it is highly recommended that the external controller provide a default grant to the UMC to allow fast wakeup of an initial L2 page. The GPSC should manage any wake-to-wake time delay required to allow the current to settle before allowing another component or memory page to be woken up.

When the UMC wishes to wake more than one page, either due to multiple wakeups being requested through the command register or a DMA/CPU access to a page coincident with a command-driven page wakeup, the external controller must enforce holding off secondary accesses. In other words, GEM will enforce the wake-to-access time of only a single access at a time, but will not manage simultaneous accesses. GEM will enforce a wait of six clk2 cycles between sequential page wakeups to assist with this arbitration.

CPU Wake-up Sequencing

GEM will also perform handshaking for chip-level wake-up sequencing for waking from static power-down. GEM does not perform any user-visible cycle counting internally. It is assumed that this is done in the chip-level arbiter if necessary to account for power-rail transients caused by the GEM wakeup. As with the RAM page wakeup, GEM will assert gem_cpuwperm_req when it wishes to initiate the wakeup process. The signal is de-asserted as soon as the CPU (last component to wake) notifies the PDC that it is awake (cpu_pd_pdstat='0').

As with the dynamic L2 sequencing, gem_cpuwperm_grant must pulse high for exactly one GEM clk2 cycle in response to gem_cpuwperm_req. Also as described for memory wake-up sequencing, GEM manages the wake-to-access time for the RAMs. There is a count value for L1P, L1D, and the L2 memories that are set via tie-offs to their respective controllers—gem_11p_wakecnt, gem_11d_wakecnt, gem_12_wakecnt0, and gem_12_wakecnt1. Details are found in the PMC, DMC, and UMC architecture specifications, respectively. The wake-to-access tie-offs are latched during a global reset, or when gem_pstatic_cfg_update is asserted to '1'.

Chip-Level Sequence Arbiter

An external arbiter that is managing the _grant/_req handshaking must be GEM clk2-timed. It is a strict requirement that the _grant responses to GEM be exactly one clk2 cycle wide. As mentioned in the preceding sections, GEM can sequence the wake-up of the CPU and L2 RAM pages with other chip-level components. Support for this requires arbitration to be handled in a chip-level controller.

When waking from static power-down, the CPU is the only component that gets sequenced. This is because the UMC will not wake its L2 RAM pages. Instead, the RAMs will be kept in their sleep-with-retention mode until either the user wakes them in software or an access to the page is made. This sequencing is handled by the PDC for the CPU.

When in a static sleep mode, the expectation is that the default state of the gem_wperm_grant is low, meaning that the PDC does not have permission to wake GEM. The PDC will request a change in the value by asserting gem_cpuwperm_req='1' to the chip-level controller. Before granting permission to GEM to wake up, the chip-level controller should first deny wake permission to all other components (as necessary) for which it is arbitrating, then the controller should grant permission to GEM by asserting gem_cpuwperm_grant='1' to GEM for exactly one clk2 cycle.

The controller should not grant permission to any other components (as necessary) until after the gem_cpuwperm_req signal is de-asserted to '0'. It is the responsibility that any delay required between the CPU and other chip level components or memory is managed by the GPSC.

It is suggested that the GPSC provide a per-sequencing-port tie-off to set the default grant state. Whenever no requests are pending to the GPSC these ports should provide an x_wperm_grant of '1'. Whenever a request is posted to the GPSC, the default grants should be removed (and corresponding wait counts obeyed) prior to granting permission to the requester. This is a performance optimization for dynamic modules.

Slave DMA Command Servicing

GEM must service slave DMA commands regardless of its power-down state. When powered-down, the behavior of the EMC depends on whether or not CBA clock stop request handshaking is supported. In all cases, the slave DMA port of the EMC must de-assert its command ready output (gem_to sdma_cready=0) to the switch fabric, to prevent latching new commands. Any commands posted by the slave DMA at this point will stall.

If the clock stop request protocol is not used, then the PDC is responsible for waking the EMC to service any slave DMA commands. If it is followed, then the LPSC will guarantee that no new commands are posted without first removing the clock stop request to GEM, as described in Section 0.

Implementation without Clock Stop Request

If the handshaking is not supported (gem_clkstp_req tied low), then the PDC must allow slave DMA commands to be serviced while in power-down. The VBUS command request signal (sdma_to_gem_creq) is routed internally to the PDC, informing it when a command is pending, and stalled. The PDC will wake the EMC and memory subsystem components, and any required external RAMs will be woken only if accessed. The slave DMA port will continue to service incoming DMA commands without returning to power-down mode until an idle state is reached, after which time the PDC will return all components to their power-down state.

Additional latency will be present on all DMA transactions, but they will be serviced normally. Aside from this delay, the switch fabric will see no functional change in GEM during a static-power-down mode.

Once the components are awake while servicing slave DMA commands, their power-down status to the PDC is updated to '10b' to avoid confusion with an awake state. As with the power-down sequence, when a component is again idle it will update its status to '01b' to inform the PDC it can be returned to its power-down state. The pd_mem_static_p-dreq signal stays asserted, so the memory components continue to inform the PDC when all activity has completed, at which time all components are returned to their static sleep states. Note also that only the external RAMs (L1P, L1D, L2) that are accessed are woken up from their sleep states.

Sequencing rules will be applied if the slave DMA accesses a powered-down L2 RAM page as defined in Section 0 if gem_clkstp_req='1.'

Implementation with Clock Stop Request

If the handshaking is supported by an external arbiter, then the infrastructure components (LPSC and SCR) are responsible for handling new slave DMA requests. The LPSC must first handshake with the PDC by removing the gem_clkstp_req input to wake GEM, then wait for gem_clk-stp_ack to be de-asserted by GEM. The SCR should then permit the slave DMA access to proceed. GEM's gem_to_s-dma_cready will be asserted after removing gem_clkst-p_ack.

It is the responsibility of the PDC to handshake with an external controller, to wake GEM as needed for DMA accesses. Note that even when following the CBA hand-shaking, slave DMA commands are accepted any time that the EMC is awake. This means that if GEM is powered up due to an emulation access, as requested through the gem_e-mu_pwdn_mask output, slave DMA commands are to be accepted while the EMC is awake.

Emulation

As mentioned previously, emulation accesses can be made to the CPU and all GEM components regardless of the power-down state of any GEM component. The emulation accesses are tagged with the sideband signal ecm_emu_p-wdn_mask, that allows the appropriate component(s) to respond to the access.

Emulation accesses made to powered-down components cause GEM to update [it's] *its* status to "transition state", as reported on the gem_pdstat[1:0] output. The emulation access may wake any necessary component(s) during the access, but the power-down state of the component(s) must be returned to the state preceding the access.

This is handled by the PDC continuing to monitor the cpu_pd_idle input. On receiving the emulation request to wake (ecm_emu_pwdn_mask) the PDC initiates the wake process as defined in Section 0, obeying the handshaking rules defined in Sections 0 and 0.

Once the emulation access has completed ecm_emu_p-wdn_mask is re-moved and, since the IDLE state of the CPU is unaltered (cpu_pd_idle stays '1') the PDC returns to power-down as defined in Section 0.

The PDC must extend the ecm_emu_pwdn_mask signal at the GEM terminal to ensure that proper CBA handshaking takes place for removing a clock stop request. The PDC keeps gem_emu_pwdn_mask high until the PDC puts GEM to sleep after the emulation access has completed. This is necessary to prevent the clocks from being killed half way through the static power-down process.

Note that gem_emu_pwdn_mask is actually implemented as a "clocks on" output. The signal is asserted high whenever either GEM is not fully powered-down or an emulation access is pending. This signal will be high during normal operation and low when fully powered-down. Emulation can force this signal high if GEM is fully powered-down and an access needs to take place.

The CPU IDLE status may change while an emulation access is ongoing. Typically the IDLE status is returned prior to the emulation access completing, and the CPU state is un-modified outside of the emulation access. The PDC should ignore the removal of the IDLE status during the emulation access.

If, however, the PC is changed in the CPU by emulation while powered down, the IDLE status is permanently removed, even after the emulation access completes. In this case the PDC must return from power-dow. This is the only case where an emulation access will cause the PDC to transition to a fully awake state.

What is claimed is:

1. A power control apparatus comprising:

a programmable global power controller[, wherein said programmable global power controller is operable to reduce the power consumption in said logic blocks in response to detecting a lack of activity within said logic blocks];

a plurality of local power controllers; and a plurality of logic blocks to be controlled, *wherein said programmable global power controller is operable to reduce power consumption in at least one of said plurality of logic blocks in response to detecting a lack of activity within said at least one of said plurality of logic blocks,* wherein at least one of said programmable global power controller and said plurality of local power controllers perform handshaking to determine [the] *a* power status for at least one of said plurality of logic blocks [and said plurality of local power controllers], *said handshaking comprising transmitting power status information pertaining to said at least one of said plurality of logic blocks from one of said plurality of local power controllers associated with said at least one of said plurality of logic blocks to said programmable global power controller, and wherein another one of said plurality of logic blocks is a CPU and said programmable global power controller is capable of powering down said CPU in response to a signal from a power controller separate from said CPU.*

2. The power control apparatus of claim 1, wherein:

said programmable global power controller is operable to communicate with said *plurality of* local power controllers.

3. The power control apparatus of claim 2, wherein:

said *one of said plurality of* local power [controller] *controllers associated with said at least one of said plurality of logic blocks* is operable to control the power consumption of said *at least one of said plurality of* logic blocks.

4. The power control apparatus of claim 2, wherein:

said programmable [local] *global* power controller is operable to control the power consumption by controlling the clock frequencies of [the] said *plurality of* logic blocks.

5. The power control apparatus of claim 1, wherein:

said programmable global power controller is operable to restore the power consumption to normal in response an external request.

6. A method of power control comprising the steps of:

[generating an idle signal;]

*detecting a lack of activity within a first logic block of a plurality of logic blocks, each of said logic blocks associated with one of a plurality of local power controllers of which a first local power controller is associated with said first logic block; and* reducing [the] power consumption of [the] *said first* logic [element associated with the idle signal] *block* utilizing a programmable global power controller, wherein [said programmable global power controller is operable to reduce the power consumption in said logic blocks in response to detecting a lack of activity within said logic blocks,] *a second logic block of said plurality of logic blocks is a CPU and said programmable global power controller is capable of powering down said CPU in response to a signal from a power controller separate from said CPU, and* wherein [at least one of] said programmable global power controller [and] *performs handshaking with* said [plurality of] *first* local power [controllers perform handshaking] *controller* to determine the power status [for at least one] of said [plurality of] *first* logic [blocks and said plurality of] *block by exchanging power status information with said first* local power [controllers] *controller*.

7. The method of claim 6 further comprising the steps of:

detecting an internal or external request; and restoring [the] *a* power state of [the] *a* logic [element] *block* associated with the request.

8. The method of claim 6 wherein:

said step of [controlling] *reducing* the power consumption of said *first* logic [element] *block* includes adjusting [the] *a* clock frequency of said *first* logic [element] *block*.

*9. A power control apparatus comprising:*

*an on-chip programmable global power controller;*

*a plurality of on-chip logic blocks to be controlled; and*

*a plurality of power controllers for controlling power to said plurality of on-chip logic blocks;*

*wherein said programmable global power controller is operable to reduce power consumption in at least one of said plurality of on-chip logic blocks in response to detecting a lack of activity within said at least one of said plurality of on-chip logic blocks;*

*wherein another one of said plurality of on-chip logic blocks is a CPU and said programmable global power controller is capable of powering down said CPU in response to a signal from a power controller separate from said CPU, and*

*wherein said programmable global power controller and said plurality of power controllers perform handshaking to determine the power status for said plurality of on-chip logic blocks by exchanging power status data bits.*

*10. The power control apparatus of claim 9, wherein:*

*at least one of said plurality of power controllers is operable to control the power consumption of said at least one of said plurality of on-chip logic blocks by controlling a clock frequency associated with said at least one of said plurality of on-chip logic blocks.*

*11. The power control apparatus of claim 9, wherein:*

*at least one of said plurality of power controllers is operable to control the power consumption by removing power to said at least one of said plurality of on-chip logic blocks.*

*12. The power control apparatus of claim 1 wherein said power controller separate from said CPU is an on-chip controller.*

*13. The power control apparatus of claim 6 wherein said power controller separate from said CPU is an on-chip controller.*

*14. The power control apparatus of claim 9 wherein said power controller separate from said CPU is an on-chip controller.*

* * * * *